Sept. 8, 1964 P. H. SHERRON 3,147,516

TELEPHONE BOOTH

Original Filed July 6, 1954 3 Sheets-Sheet 1

*INVENTOR.*

PERCIVAL H. SHERRON

*BY*

Busser, Smith & Harding

ATTORNEYS

INVENTOR.
PERCIVAL H. SHERRON
BY

ATTORNEYS

Sept. 8, 1964

P. H. SHERRON 3,147,516

TELEPHONE BOOTH

Original Filed July 6, 1954

3 Sheets-Sheet 3

INVENTOR.
PERCIVAL H. SHERRON
BY

ATTORNEYS

United States Patent Office 3,147,516

Patented Sept. 8, 1964

3,147,516
TELEPHONE BOOTH

Percival H. Sherron, Jamaica, N.Y. (% Sherron Metallic Corp., 1201 Flushing Ave., Brooklyn 37, N.Y.)

Original application July 6, 1954, Ser. No. 441,395, now Patent No. 2,928,141, dated Mar. 15, 1960. Divided and this application July 24, 1959, Ser. No. 829,365

1 Claim. (Cl. 20—3.5)

This invention relates to an improved telephone booth of the so-called stall type and, more particularly, it relates to details of the construction of the booth and elements used in the assembly thereof.

This application is a division of my prior copending application Serial No. 441,395, filed July 6, 1954, now Patent No. 2,928,141.

It is an object of this invention to provide a telephone booth having a minimum number of structural elements which can be assembled easily and rapidly into a rigid booth structure.

It is a further object of this invention to provide a telephone booth which employs in the construction thereof, whenever possible, molded plastic structural elements.

It is a further object of this invention to provide interlocking molded plastic side panels, corner posts, and door assembly parts.

The word "plastic" as employed herein should be construed as referring to such materials as acrylics, phenolics, polystyrene, or other similar plastic materials.

The word "molded" as employed herein should be construed as referring to plastic materials in extruded, sheet, laminated or other similar form.

These and other objects of the invention will become apparent from the following description when read in conjunction with the accompanying drawings, in which.

Figure 1:
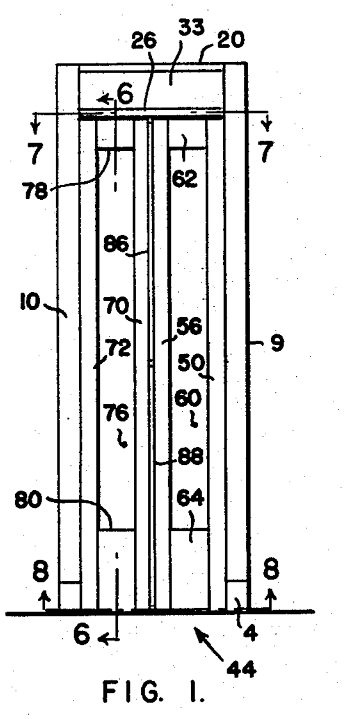
FIGURE 1 is a front elevation of an assembled telephone booth.
Figure 2:
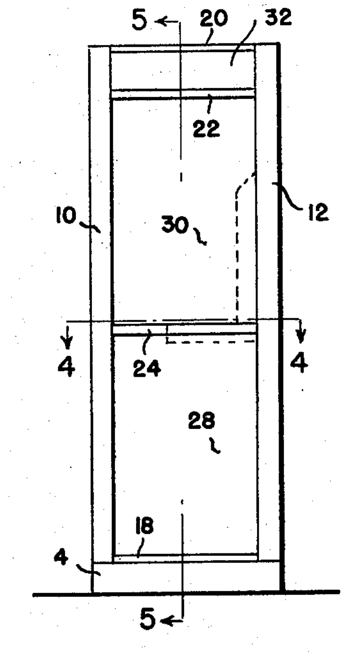
FIGURE 2 is a side elevation of the right-hand side of the booth shown in FIGURE 1.
Figure 3:
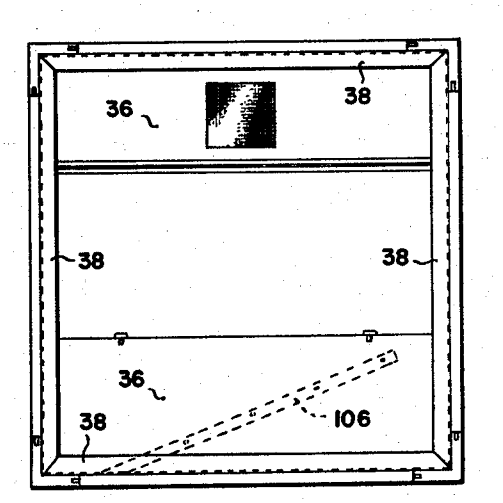
FIGURE 3 is a top view of the booth shown in FIGURE 1 with the top cover plate removed.

The telephone booth includes a base assembly comprising a base panel 2 having upwardly turned side and rear portions 4 and in inwardly turned flange 6 extending from the top of the side portions 4. The side portions 4 and flange 6 are cut away in the front of the booth to provide clearance for the booth doors in the region indicated generally at 44 in FIGURE 1 as will be described.

Two front corner posts 9 and 10 are mounted on the front corners of the base assembly. Two rear corner posts 11 and 12 are mounted on the rear corners of the base assembly. The corner posts 9, 10 and 11 are preferably solid molded plastic posts in the form of angle members. The rear corner post 12 is preferably provided with a flat interior surface 14 to facilitate the mounting of the telephone in the booth. The corner post 12 is also preferably formed of hollow section providing vertically extending internal spaces 13 through which telephone leads, power cables or other conductors may be drawn if desired. Furthermore, the hollow section reduces the amount of material involved in this corner post without unduly reducing the strength of the corner post. The corner posts are attached to the flange 6 by means of screw 7 or other suitable fastening means. The post 12 is provided with plates 15 affixed to its lower end to receive the fastening means.

The adjacent edges of the front and rear corner posts and the adjacent edges of the two rear corner posts are each provided with a vertically extending slot 16.

Horizontally extending plastic members 18 are positioned on the base assembly flange 6 and extend between the front and rear corner posts and between the rear corner posts. The ends of the members 18 may be provided with tongues adapted to enter the slots 16 in the corner posts. Horizontally extending molded plastic members 20 extend between the upper ends of all of the corner posts and may also be provided with tongues to enter corner post slots. It is noted that while the front corner posts 9 and 10 are not provided with slots adjacent to the door opening they are provided with slots in the region above the door opening. Molded plastic members 22 and 24 extend between the front and rear corner posts and between the rear corner posts intermediate the upper and lower ends thereof. The members 22 and 24 may also be provided with tongues to enter the corner post slots.

The lower members 18 are provided with slots along their upper edges and thus form channels adapted to receive lower side panels 28 in the form of solid plastic sheets or plates. The side panels 28 also fit into the vertically extending slots 16 of the corner posts and into slots provided on the undersides of the members 24. The members 24 are also provided with slots along their upper edges and thus form channels adapted to receive plastic upper side panels 30. The side panels 30 also fit into the vertically extending slots 16 of the corner posts and into slots provided on the underside of the members 22. The members 22 are provided with slots along their upper edges and thus form channels adapted to receive the lower edges of plastic lintel panels 32. The lintel panels 32 also fit into vertically extending slots 16 of the corner posts and into slots provided on the undersides of the members 20. A plastic member 26 extends between the front corner posts above the door opening. The member may be provided with tongues to enter slots in the front corner posts above the door opening. The member 26 is provided along its upper edge with a slot to form a channel adapted to receive a plastic front lintel panel 33. The front lintel panel also fits into vertically extending slots in the front corner posts and into slots provided on the undersides of the member 20 extending across the front of the booth.

An angle 34 having an inwardly turned flange is affixed to the interior surface of each of the corner posts by means of screws or other suitable fastening means and extends along the interior surfaces of the members 22 and the member 26 and serves to support a plastic ceiling panel 36. An angle 38 having an inwardly turned flange is affixed to the interior surface of each of the corner posts by suitable fastening means and extends along the interior surfaces of each of the uppermost members 20 and is adapted to support a top cover plate for the booth not shown in the drawings. Strap members 40 and 42 are affixed to the interior surface of each of the corner posts and extend along the interior surfaces of the members 24 and 18, respectively. The angles 34 and 38 and the strap members 40 and 42 are preferably formed of stainless steel and serve to hold the corner posts in engagement with their associated side panels and horizontally extending channel forming members. This method of construction permits assembling the corner posts, the side panels, the lintel panels and the various channel forming members without the use of cements or other means for sealing the parts into engagement. The entire booth is retained in an assembled position by the straps and the angles and by means of the fastening screws attaching the corner posts to the base assembly.

Figure 4:
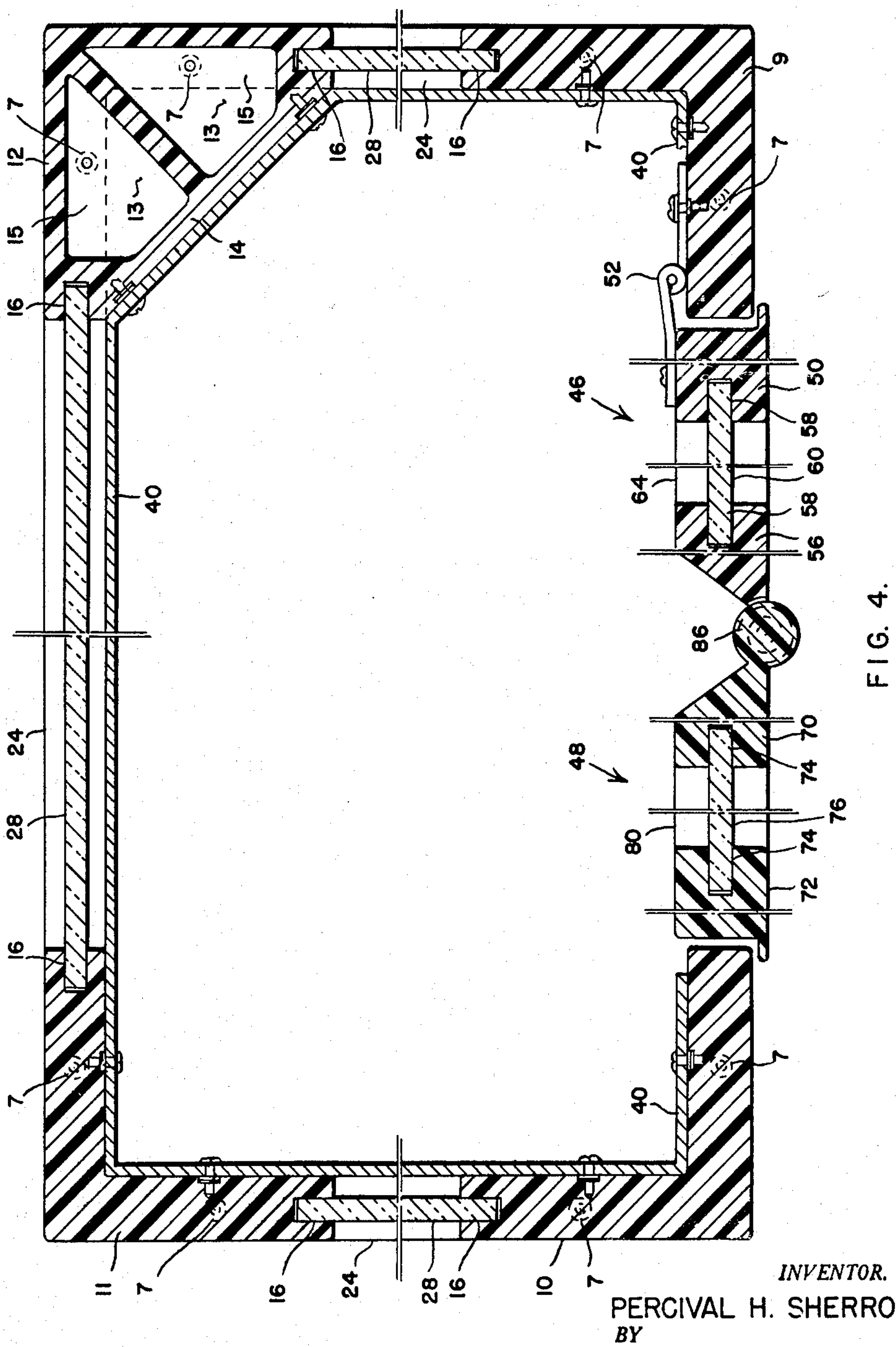
FIGURE 4 is a transverse section through the booth taken on the trace 4—4 of FIGURE 2.
Figure 5:
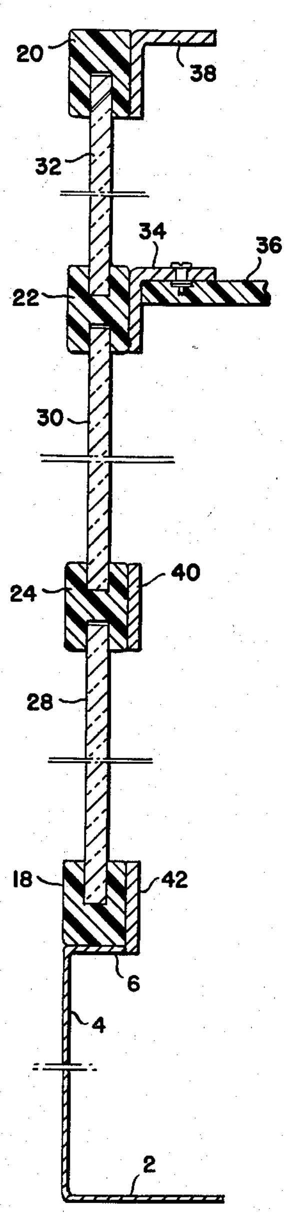
FIGURE 5 is a vertical section through the side of the booth taken on the trace 5—5 of FIGURE 2.

A pair of doors, as indicated generally at 46 and 48 in FIGURE 4, form a door assembly mounted in the door opening of the booth has indicated generally at 44 in FIGURE 1. The door 46 includes a vertically extending post 50 which is attached to the right front corner post 9 by means of a hinge 52. The door 46 also includes a post 56. The door posts 50 and 56 are provided along their adjacent edges with vertically extending slots 58. Upper and lower horizontally extending channel forming members 62 and 64, respectively, extend between the top ends and the bottom ends of the door posts 50 and 56. The members may be provided at their ends with tongues adapted to enter the slots 58 in the door posts. A door panel 60 is positioned between the upper and lower members 62 and 64 and between the door posts 50 and 56 and is retained within the slots 58 in the door posts and in slots formed by the channel forming members 62 and 64. The door posts 50 and 56, the upper and lower members 62 and 64 and the door panel 60 are each formed from a suitable plastic material. The door parts are retained together by straps 66 and 68 formed preferably of metal extending across the top and bottom surfaces of the door and attached to the door posts by screws or other suitable fastening means.

The door 48 is similarly formed of a post 70 and a post 72 each of which is provided with a vertically extending slot 74 within which a door panel 76 is mounted. The door panel 76 is mounted between upper and lower members 78 and 80 which extend between the posts 72 and 70 and are provided with slots for the reception of the upper and lower edges of the panel 76. The door 48 is retained in assembled position by a top plate 82 and a bottom plate 84 which are attached to the ends of the door posts 70 and 72.

The door post 70 is provided for the upper half of its vertical length and along its right-hand edge with an enlarged extension 86 of generally circular section. The door post 56 is provided for the lower half of its vertical length adjacent to its left-hand edge with an enlarged extension 88 of generally circular section. The upper surface of the extension 88 of the post 56 and the lower surface of the extension 86 of the post 70 are each provided with a cup-shaped insert 90. The two inserts are adapted to receive a pin 92 which serves as a hinge pin at the center of the doors.

Figures 6, 9, 10:
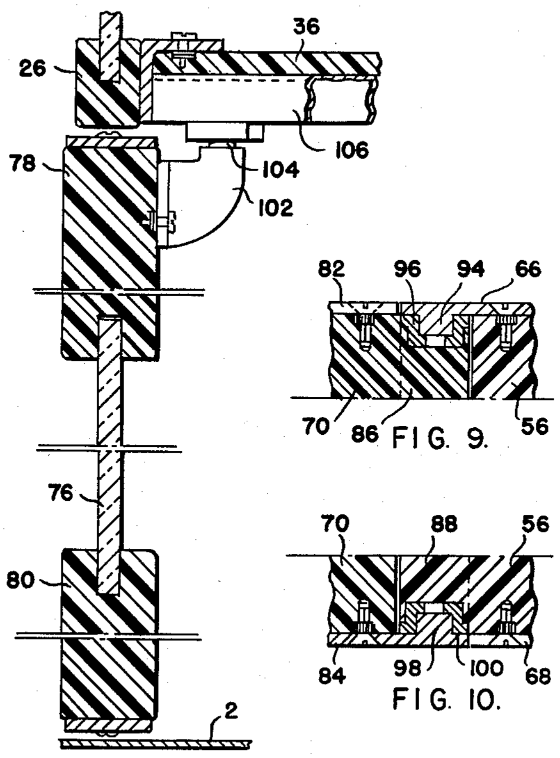
FIGURE 6 is a vertical section through one of the doors of the booth taken on the trace 6—6 of FIGURE 1.
FIGURE 9 is a fragmentary sectional elevation of the portion of the doors indicated by the trace 9—9 in FIGURE 7.
FIGURE 10 is a fragmentary sectional elevation of the portion of the doors indicated by the trace 10—10 in FIGURE 8.
Figure 7:
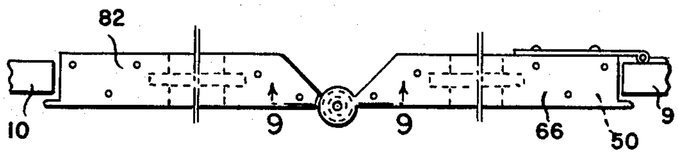
FIGURE 7 is a view looking down on the top of the doors of the booth as indicated at 7—7 in FIGURE 1.
Figure 8:
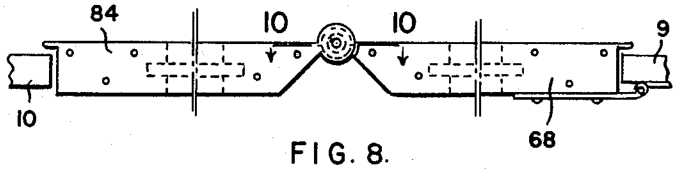
FIGURE 8 is a view looking up at the bottom of the doors of the booth as indicated at 8—8 in FIGURE 1.

The plate 66 extending across the top of the door 46 is provided at its left-hand end, as viewed in FIGURE 9, with an extension extending over the extension 86 of the door post 70 and carries a projection 67 which is adapted to fit into a cup 96 recessed in the extension 86 of the door post 70. This arrangement serves as a hinge pin at the top of the doors.

The plate 84 extending across the bottom of the door 48 extends below the extension 88 of the door post 56 and is provided with an upwardly extending portion 98 which is adapted to enter a cup 100 recessed in the extension of the door post 56. This arrangement serves as a lower hinge pin for the doors.

Figure 11:
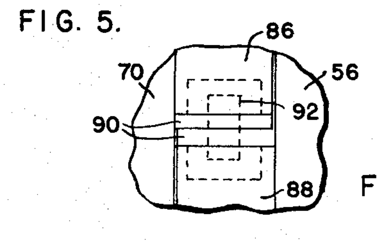
FIGURE 11 is a fragmentary elevation partly in section showing the center hinge between the doors.

Affixed to the member 78 at the top of the door 48 is a fitting 102 carrying a swivel mounted block 104 which is adapted to pass within a guide channel 106 affixed to the underside of the ceiling plate 36. These parts serve to guide the outer or left-hand edge of the door assembly as the doors are opened and closed by pivoting the doors on the hinge 55 and around the hinge points shown in FIGURES 9, 10 and 11.

From the foregoing it will be evident that the telephone booth construction described herein provides a booth formed substantially completely of molded plastic elements which may be assembled without the need for adhesives or sealing means simply by attaching the straps 40 and 42 and the angles 34 and 38 as has been described. Both the booth frame and the door assembly being substantially completely formed from plastic materials are completely resistant to the effects of moisture or rain. The bands 40 and 42 and the angle members 34 and 38 as well as the floor pan assembly 2, 4 and 6 may be, if desired, formed of stainless steel or other suitable corrosion resistant material.

This construction provides a telephone booth in which the various structural members may be easily replaced and wherein the relatively large coefficient of expansion of plastic materials does not adversely affect the booth structure.

If the booth is adapted for outdoor use, the side panels 28 and 30 may be made of transparent plastic materials and the top of the booth provided with a suitable rain shedding roof. On the other hand, if the booth is adapted for indoor use, the panels 30 and 28 may be formed of translucent or opaque materials and the top of the booth provided with a panel for excluding dust and dirt if desired.

Suitable booth lighting means may be installed above the ceiling panel 36 in a conventional fashion. As previously noted, the telephone is mounted on the rear corner post 12. In place of the corner post 12 shown in the drawing, a corner post identical to the corner post 11 may be employed and telephone mounting means may then be employed which are entirely conventional in the art.

What is claimed is:

In a telephone booth, an upright wall structure comprising a generally rectangular base member, a pair of corner post members respectively over diagonally opposite corners of said base member and a molded one-piece post member over one of the other corners of said base member, a pair of side panel members respectively disposed between adjacent ones of said post members, said molded corner post member including a pair of longitudinally extending outer side walls disposed generally at right angles to one another, and a longitudinally extending inner side wall disposed diagonally across said outer side walls, whereby the walls aforesaid conjointly form a seamless hollow tubular member uniform and triangular in transverse section, said hollow tubular member being provided with a pair of slots extending longitudinally thereof, said slots being of a configuration similar to the marginal portions of said side panels for removably receiving the opposed marginal portions of said side panels, said inner side wall providing a flat surface of sufficient extent for the mounting of a telephone assembly thereon, and the hollow interior of said corner post being adapted for accommodating electric wires passed therethrough, and a plurality of vertically spaced rigid members each extending horizontally across the inner side wall of said hollow tubular member and across said panel members to said pair of post members, and means securing each of said rigid members to each of said post members thereby to secure said post members in engagement with the panel members, said one piece corner post being provided internally thereof with an integral wall disposed in a longitudinal plane passing through the right angle corner of said post member and disposed generally at a right angle to said inner side wall thereby to divide the hollow interior of said post member into two generally equal parts, and with an integral end wall closing off the lower extremity of said post member and adapted for being seated upon and fixed to the underlying corner of said base structure.

(References on following page)

References Cited in the file of this patent

UNITED STATES PATENTS

| | | |
|---|---|---|
| 503,873 | Powers | Aug. 22, 1893 |
| 859,727 | Bergvall | July 9, 1907 |
| 1,857,913 | Judelson | May 10, 1932 |
| 2,101,036 | Olbrich | Dec. 7, 1937 |
| 2,214,187 | Swedman | Sept. 10, 1940 |
| 2,328,928 | Sherron | Sept. 7, 1943 |

| | | |
|---|---|---|
| 2,337,885 | Hallam | Dec. 28, 1943 |
| 2,388,297 | Slaughter | Nov. 6, 1945 |
| 2,584,626 | Sherron | Feb. 5, 1952 |
| 2,678,705 | Haines | May 18, 1954 |
| 2,822,588 | West | Feb. 11, 1958 |

OTHER REFERENCES

Modern Plastics, pages 112 and 113, March 1952.